Dec. 2, 1952  E. A. MADDUX  2,619,760
ARTIFICIAL FISH LURE
Filed Oct. 23, 1948  2 SHEETS—SHEET 1

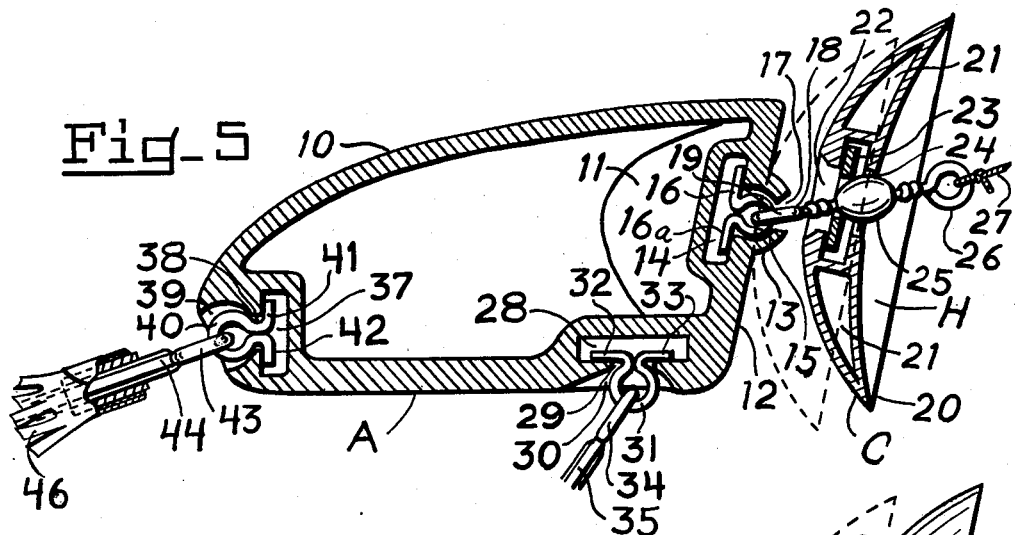
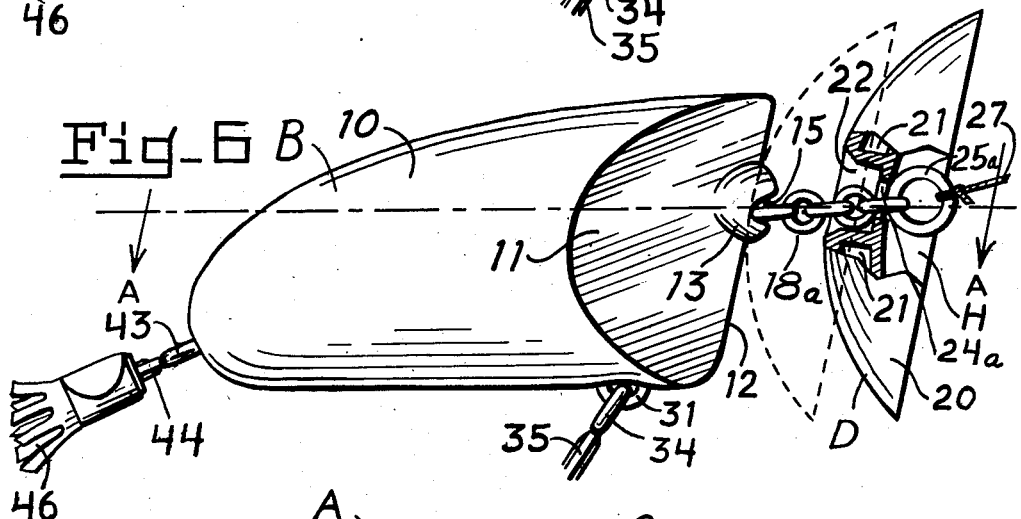
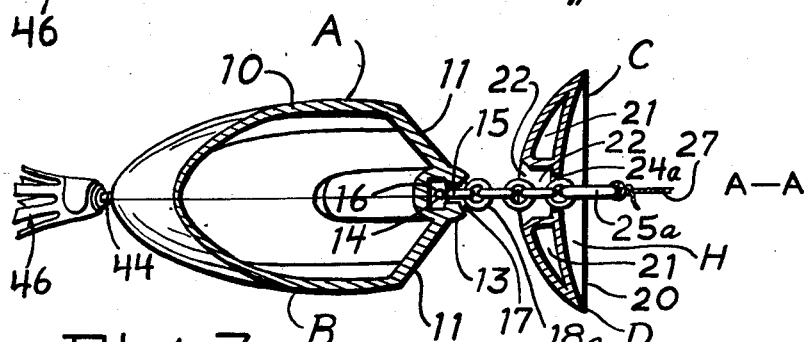

Eddy A. Maddux INVENTOR.
BY
M. Y. Charles ATTORNEY.

Patented Dec. 2, 1952

2,619,760

UNITED STATES PATENT OFFICE 2,619,760

ARTIFICIAL FISH LURE

Eddy A. Maddux, Wichita, Kans.

Application October 23, 1948, Serial No. 56,110

5 Claims. (Cl. 43—42.15)

My invention relates to an improvement in artificial fish lures, and is an improvement over my pending application for a fish lure; filed January 30, 1948; Ser. No. 5,310; which issued as Patent No. 2,523,536 on September 26, 1950, and deals more particularly with the mounting of the head portion of the lure on the body portion of the lure and the action achieved by the improved mounting.

A further object of the invention is to provide a more simple head mounting; one that allows more freedom of movement of the head; one that is simplified in construction; and one that is inexpensive and easy to make.

A still further object of the invention is to provide a lure of the kind mentioned that includes an improved structure for mounting or attaching the fish hooks to the lure. These and other objects will be more fully described and explained as this description progresses.

Now referring to the accompanying drawings in which similar numerals of reference designate the same parts throughout the several figures of the drawings:

Fig. 5 is an enlarged detail longitudinal sectional view of the fish lure.

Fig. 6 is an enlarged detail side view of the fish lure, a part of the head portion being broken away and showing in detail a modified form of the head retaining means for the lure.

Fig. 7 is a detail sectional view of the fish lure, the view being as seen from the line A—A in Fig. 6 and looking in the direction of the arrows.

Figure 1:
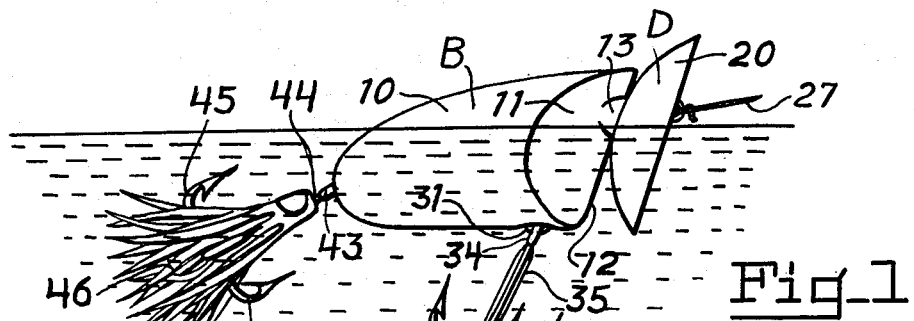
Fig. 1 is a side view of my improved fish lure.

In the drawings the fish lure is shown as having a hollow body portion 10 that is ovate in transverse cross section, and tapers off longitudinally towards the rear portion thereof, the top side tapering downwardly more than the bottom tapers upwardly. The front end of the body portion 10 is V or wedge shaped as indicated at 11, and having the ege 12 of the V or wedge shaped portion 11 sloping downwardly and rearwardly from top to bottom of the body portion 10. Substantially one-third of the way down from the top of the wedge 11—12 and on the edge 12 thereof is formed a ball like portion 13, a part of which projects forwardly beyond the edge 12 of the wedge formation 11—12. The ball formation 13 and the front portion of the wedge 11—12 behind the ball 13 is made hollow as shown at 14. The fish lure is provided with an attachment element having an eye portion 15 and laterally opposite extending and aligned leg elements 16 and 16a that are positioned in the hollow 14 with the eye 15 being positioned in the hollow of the ball formation 13 and extending into an opening 17 in the front of the ball formation 13.

As shown in Fig. 5, one end of a wire 18 is looped through the eye 15 and then twisted to form an attachment eye 19 that is linked into the eye 15.

The fish lure is provided with a circular and cup shaped head element 20, the body of which is hollow as indicated at 21. At the center of the back side of the head element 20 is a ball socket formation 22 in which the ball formation 13 on the body portion of the lure is loosely receivable. As shown in Fig. 5 the head 20 has a washer 23 loosely held in the head portion 20 and provides an opening 24 through the head 20 at the center thereof.

In Figures 6 and 7 the head 20 is shown as not having the washer 23 but it does have an opening 24a therethrough that is concentric with and opens into the ball socket 22.

In the assembly of the lure, both the body and head are molded in halves A, B and C, D, as is illustrated in Fig. 5, and also indicated in Figs. 2, 3, 4 and 7.

The swivel 25 with the washer 23 and the eye ring 15 previously attached, are merely dropped (thus assembled) into the halves of the head and body. Also the two sets of hooks with their eye rings attached are dropped into their body slots. Then the second body half and the second head half are glued into place, thus sealing the three rings permanently in the body.

The ball formation 13 of the body 10 is loosely received in the ball socket 22 and the back side of the head element 20 rests against the edge 12 of the wedge shaped portion 11—12 of the body portion 10 and the ball portion 13 serves as a stationing means for the head 20 relative to the body 10. This having been done a ball-line element 25 that is larger in diameter than the hole in the washer 23, and having a hole therethrough, is slipped on the wire 18 and the outer end of the wire 18 is then looped and twisted to form an eye 26 in which one end of a fishing or tow line 27 may be tied for towing the lure. The ball-like element 25 serves as a retainer for the head 20 to keep the head 20 from slipping off of the wire 18.

Figure 2:
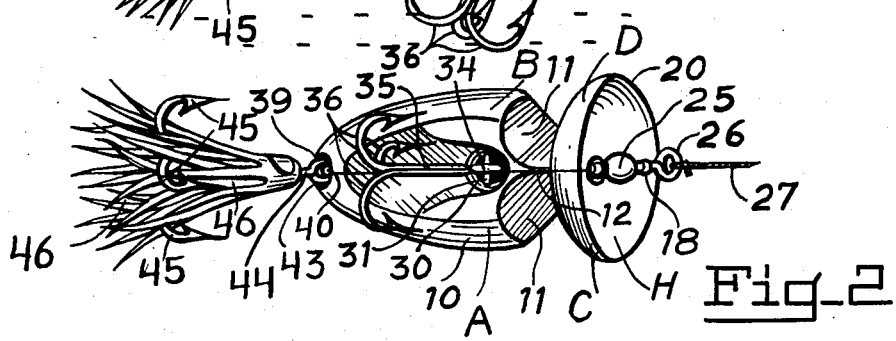
Fig. 2 is a bottom plan view of my improved fish lure.
Figure 3:
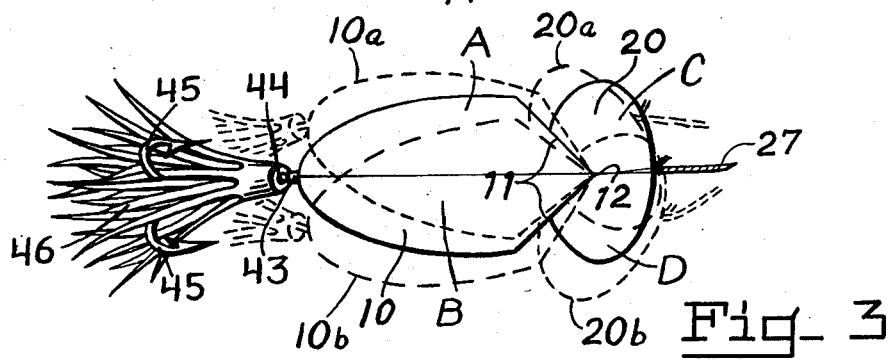
Fig. 3 is a top plan view of my improved fish lure.
Figure 4:
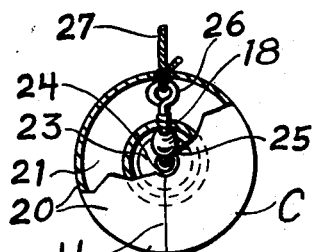
Fig. 4 is a front view of my improved fish lure, parts being broken away for convenience of illustration.

In Figures 6 and 7 is shown a modified form of the head 20 and tow line attachment means, and in which the head 20 only has the ball socket 22 and the concentrically positioned hole 24a and a short length of chain 18a is substituted for the wire 18 and a large link 25a on the outer end of the chain 18a serves the same purpose as the ball-like element 25 and eye 26 does in Figures 2, 4 and 5.

The lower front and central portion of the body element 10 has a chamber 28 formed therein that has a small opening 29 connecting therewith and opening into a recess or depression 30 in the under side of the body element 10 at a point adjacent or near the lower end of the edge 12 of the wedge formation 11—12.

The body element 10 is provided with an eye shaped hook attachment element 31 that is revolvably or swivelly positioned in the depression 30 and is provided with leg elements 32 and 33 that loosely pass through the opening 29 and are bent oppositely from, and in alignment with each other in the chamber 28 as shown in Fig. 5.

An eye 34 formed on the upper end of the shank portion 35 of a triple fish hook assembly 36 is linked or hooked through the eye 31 as a means of attachment of the hooks 36 to the body 10.

A chamber 37 is formed in the rear end of the body element 10 and a small opening 38 connects between the chamber 37 and a recess 39 in the extreme rear end of the body 10. An eye element 40 is revolvably or swivelly positioned in the depression 39 and is provided with leg elements 41 and 42 that loosely pass through the small opening 38 and are oppositely bent in alignment with each other in the chamber 37 as shown in Fig. 5.

An eye 43 is formed on the upper end of the shank portion 44 of a triple fish hook assembly 45. The fish hook assembly shank 44, and 35 if desired, is provided with a streamer assembly 46. The streamer assembly is made of any suitable material such as flexible plastic sheet, rubber, textile material and the like. The streamer 46 is made of a single piece of sheet material that is cut into the streamer 46 from one edge of the material and leaving the other or opposite edge of the material uncut. The uncut edge is then cemented and pulled and wrapped tightly around the hook shank 44, and 35 if desired, to form the many streamers 46 that extend toward and past the hooks 45 or 36 and from which the hooks 45 or 36 emerge as shown.

The operation of the lure is as follows. When the lure is dropped in the water and towed along by the line 27, the lure will float and the upper portion of the lure will be positioned above the surface of the water while the balance of the lure, the hooks and streamers will be submerged in the water. As the lure is towed along by the line 27, the body portion 10 will move forward and the edge 12 of the wedge formation 11—12 will engage the back side of the head element 20 and push it forward ahead of the body portion 10. As the head 20 is being pushed along through the water, the pressure of the water thereagainst will cause the head element 20 to oscillate or rock from side to side as indicated by the dotted lines 20a and 20b. As the head oscillates it will impart a wagging motion to the body portion 10 as indicated by the dotted lines 10a and 10b, and wagging motion of the body 10 in turn imparts a similar wagging motion to the streamer 46 and hooks 45 therein, and of course, the hooks 36 will also be swung in accordance with the movements of the body 10. The order of the movements of the several portions of the lure is such that the lure takes on a wriggling motion or effect as it moves along and therefore becomes particularly attractive to the fish which will strike or grab at the lure and will subsequently be caught by the hooks 45 or 36. Through the use of this lure it has been demonstrated that the lure is unusually attractive to the fish and the percentage of fish catches is considerably above that of the average on competitive lures.

While the lure as shown in the drawings and herein described is what is believed to be the preferred form of the lure, it is to be understood that such modifications of the lure may be employed as lie within the scope of the appended claims without departing from the spirit and intention of the invention. Now having fully shown and described my invention, what I claim is:

1. In a fish lure of the kind described; said lure having a forward section and a rear section, the forward section being circular and cup shaped, the rear section being ovate in cross section and having its forward portion wedge shaped, said wedge shaped portion being vertically positioned, the edge of said wedge shaped portion having a ball shaped element formed thereon and projecting forwardly therefrom, the forward section having a ball socket formed in the center of the back side thereof to receive the ball shaped element, said socket being deeper than the projection of said ball shaped element, said forward section having an opening therethrough, said opening being concentric with and smaller in diameter than the ball socket, a tow element, said tow element loosely and slidably passing through the opening and ball socket in said forward section and being attached at one end to an attachment element at the center of said ball shaped element, the back side of the forward section being engageable with the edge of the shaped wedge position of the rear section, and means on the tow element for retaining the forward section thereon.

2. In a fish lure of the kind described; said lure having a body section and a head section, the forward end portion of the body section being wedge shaped and having the sharp edge of the wedge vertically positioned, said head section having a forwardly directed concave face portion, the rear portion of the head section resting against the sharp vertical edge of the wedge for sidewise rocking movements of the head section relative to the body section, and for propulsion purposes of the head section by the body section, and a flexible tow element, a part of said flexible tow element loosely and slidably passing through the central portion of the head section and one end of the tow element being securely attached to the wedge portion of the body section.

3. In a fish lure device of the kind described; said lure device having a body section and a head section, the forward end portion of the body section being wedge shaped and the sharp edge of the wedge being vertically positioned, the head section having a forwardly directed concave face, the rear of the head section resting against the sharp vertical edge of the body wedge portion to permit reciprocating side wise rocking movements of the head section relative to the body section, a ball and a socket element, said ball and socket formations being formed as integral parts, one on the vertical edge portion of the body wedge portion and the other on the rear of the head section, said ball being loosely seated in the ball socket to station the head section before the body section, a tow element, a portion of said tow element loosely and slidably passing through the central portion of the head section and one end of the tow element being securely attached to the forward edge portion of the wedge portion substantially on the longitudinal axis line of the body and head sections and the ball and socket assembly carried by the body section of the fish lure device.

4. In a fish lure of the kind described; said lure having a head section, a body section and a forward and generally vertically extending edge portion at the front of the body section affording a pivot edge for sidewise rocking movement of the head section, and means extending through the head section and attached to the body section for towing the body section to push the head section through the water, said head section having means affording access of said attaching means through said head section and affording clearance adjacent said attaching means for rocking movement of said head section relative to said attaching means as well as relative to said body section on said pivot edge, said lure having means for stationing said head section before said body section comprising a ball on one of said sections and a socket in the other of said sections, said ball being loosely seated in said socket when said head section and said body section are in engagement along said pivot edge.

5. In a fish lure of the kind described; said lure having a head section and a body section, said body section having a forward and vertically positioned edge portion, and means on the body section and on the head section before the body section with the rear face of the head section resting against the vertical edge portion of the body section to permit sidewise rocking movements of the head section against the body section, and means attached to the body section for towing the body section to push the head section through the water for purposes of rocking the head section in sidewise movements, said lure having means for stationing the head section before the body section comprising a ball on one of said sections and a socket in the other of said sections, said ball being loosely seated in said socket when the head section is in engagement with the vertical edge portion of the body section.

EDDY A. MADDUX.

REFERENCES CITED

The following references are of record in the file of this patent:

UNITED STATES PATENTS

| Number | Name | Date |
| --- | --- | --- |
| 661,869 | Henkenius | Nov. 13, 1900 |
| 870,069 | Wilcox | Nov. 5, 1907 |
| 1,842,591 | Dunkelberger | Jan. 26, 1932 |
| 1,994,878 | Smith | Mar. 19, 1935 |
| 2,069,972 | Schroeder | Feb. 9, 1937 |
| 2,134,330 | Fink | Oct. 25, 1938 |
| 2,224,389 | Haselwood | Dec. 10, 1940 |
| 2,441,302 | Watkin | May 11, 1948 |

FOREIGN PATENTS

| Number | Country | Date |
| --- | --- | --- |
| 875,526 | France | June 22, 1942 |